United States Patent [19]
Pollmann et al.

[11] Patent Number: 5,809,538
[45] Date of Patent: Sep. 15, 1998

[54] DRAM ARBITER FOR VIDEO DECODER

[75] Inventors: Stephen C. Pollmann; Serdar Yilmaz, both of San Diego, Calif.

[73] Assignee: General Instrument Corporation, Horsham, Pa.

[21] Appl. No.: 598,199

[22] Filed: Feb. 7, 1996

[51] Int. Cl.⁶ .................................................. G06F 12/00
[52] U.S. Cl. ...................... 711/151; 711/106; 711/167; 395/293; 395/520; 395/728; 395/729
[58] Field of Search ..................... 395/433, 233, 395/517, 520, 293, 877, 728, 305, 222, 861, 182.04, 294, 800, 478, 729; 348/718

[56] References Cited

U.S. PATENT DOCUMENTS

| | | | |
|---|---|---|---|
| 4,760,521 | 7/1988 | Rehwald et al. | 395/433 |
| 4,792,929 | 12/1988 | Olson et al. | 365/233 |
| 4,991,110 | 2/1991 | Hannah | 395/517 |
| 5,001,652 | 3/1991 | Thompson | 395/520 |
| 5,038,276 | 8/1991 | Bozzetti et al. | 395/293 |
| 5,072,420 | 12/1991 | Conley et al. | 395/877 |
| 5,168,568 | 12/1992 | Thayer et al. | 395/305 |
| 5,216,635 | 6/1993 | Kass et al. | 365/222 |
| 5,301,279 | 4/1994 | Riley et al. | 395/861 |
| 5,313,624 | 5/1994 | Harriman et al. | 395/182.04 |
| 5,315,388 | 5/1994 | Shen et al. | 348/718 |
| 5,546,547 | 8/1996 | Bowes et al. | 395/294 |
| 5,598,575 | 1/1997 | Dent et al. | 395/800 |

*Primary Examiner*—Tod R. Swann
*Assistant Examiner*—Fred Fei Tzeng
*Attorney, Agent, or Firm*—Barry R. Lipsitz; Ralph F. Hoppin

[57] ABSTRACT

A memory control and management system efficiently multiplexes access to a dynamic random access memory (DRAM) among several client processes in an MPEG or similar digital television delivery system or the like. These processes can include, for example, an on-screen display (OSD) graphics processor, a microprocessor interface, graphics accelerator functions, and audio and data processors. An arbiter receives packetized data from an MPEG transport layer for distribution to an associated DRAM. The arbiter sequentially time-multiplexes access to the DRAM by the client processes according to priority criteria, including the bandwidth requirements of the client processes, and whether a client process is requesting access. Access is granted for a predetermined period as long as the client is requesting access. Access can be terminated early if the client no longer requests access, or if a new row in the DRAM must be addressed, and the re-addressing period will consume the remainder of the available data transfer cycles in the access period. The invention is particularly applicable to a digital video decoder where an on-screen display graphics processor consumes a large portion of the DRAM interface bandwidth.

19 Claims, 7 Drawing Sheets

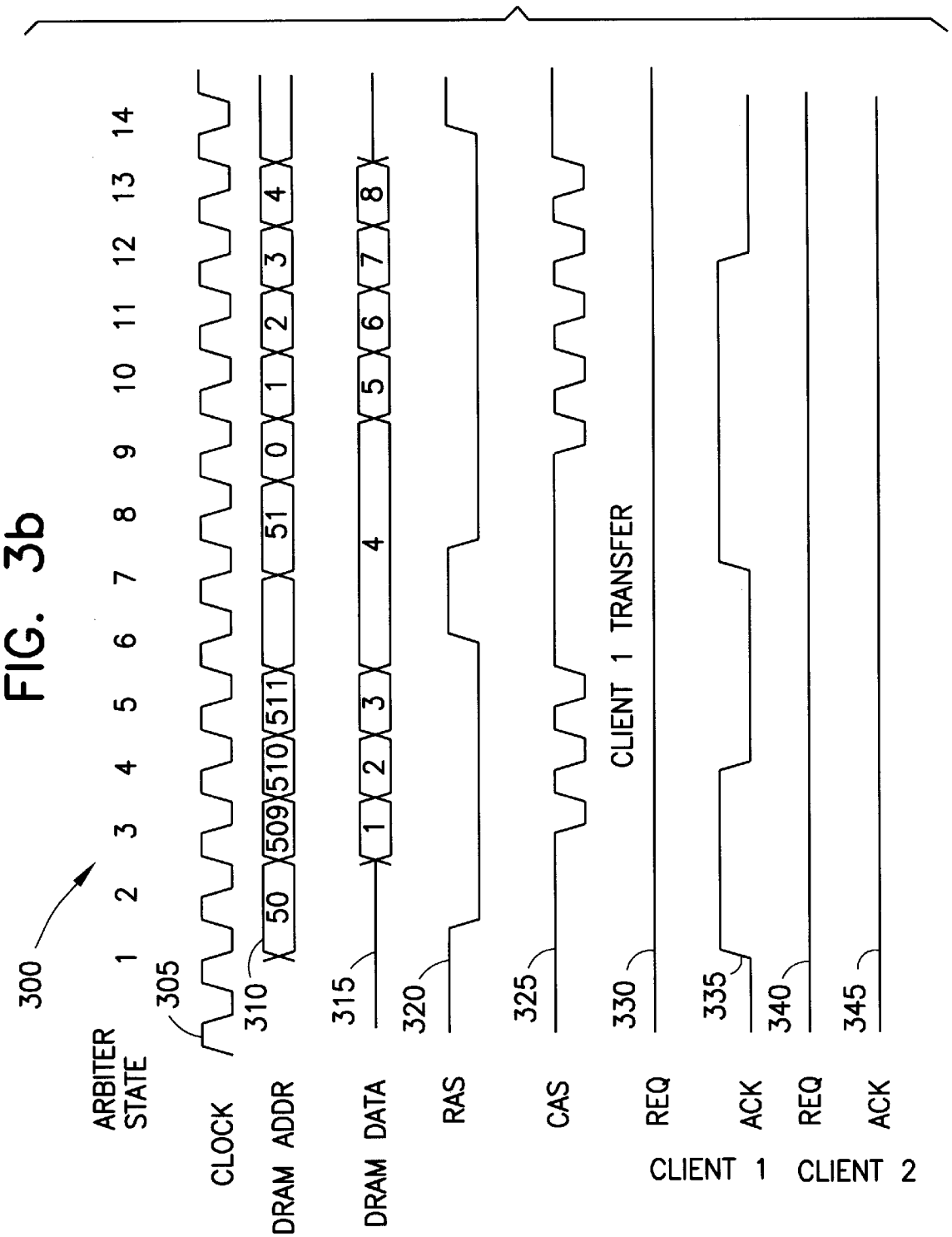

DRAM ARBITER FOR VIDEO DECODER

BACKGROUND OF THE INVENTION

The present invention relates to a memory control and management system, and more particularly to a memory arbiter which efficiently multiplexes access to a dynamic random access memory (DRAM) among several "client" processes in a digital television delivery system.

Digital transmission of television signals can deliver video and audio services of much higher quality than analog techniques. Digital transmission schemes are particularly advantageous for signals that are broadcast by satellite to cable television affiliates and/or directly to home satellite television receivers. It is expected that digital television transmitter and receiver systems will replace existing analog systems just as digital compact discs have largely replaced analog phonograph records in the audio industry.

A substantial amount of digital data must be transmitted in any digital television system. This is particularly true where high definition television ("HDTV") is provided. In a digital television system, a subscriber receives the digital data stream via a receiver/descrambler that provides video, audio, and data services. Such services can include a graphical on-screen display (OSD) that informs the consumer of the various programming options available, and allows the consumer to interact with the service provider.

For example, the consumer can order pay-per-view programming for movies and special television events, order items from a home shopping channel, make an inquiry regarding the consumer's account status, or enter information such as an authorization code to control access to specific programming services. The consumer can also participate in contests, opinion polls, or other interactive activities. The OSD data is generated locally in a set-top box according to programming data in the received television signal. Predefined display templates and other formats are employed as a backdrop for the program scheduling data. Furthermore, a "trickle" data stream at a low data rate can gradually provide updated programming information that is stored for later use, while a "demand" data stream provides data at a higher rate in response to specific customer requests. See co-pending, commonly assigned U.S. patent application Ser. No. 08/502,774 (M. Eyer et al.), filed on Aug. 11, 1995, which is incorporated herein by reference. High-rate demand data for the OSD processor may be required, for instance, when the viewer wishes to view a program schedule several days in advance.

The audio portion of the signal can provide a high-fidelity stereo signal that accompanies a television program. The audio may also contain an alternate language accompaniment for foreign-language viewers. Moreover, audio-only services can be provided which allow the consumer to listen to a variety of high fidelity music programming.

Data transmitted with the television signal can provide closed captioning information for the hearing-impaired, stock price data, and weather information, for example. This data can be displayed concurrently with a television program. Alternately, digital data can be downloaded to a data processor such as a personal computer for various purposes.

Moreover, various data storage devices must be provided in a practical video decoder. For example, a video decompression processor (VDP) in the decoder requires a memory to store data during the decompression processing. Typically, random access memories, including dynamic random access memories (DRAM) are employed for this purpose since they provide a relatively low cost storage medium. This is particularly true in consumer products such as television receivers, where it is imperative that the cost of the system is minimized. A DRAM is organized as an array of rows (or "pages") and columns. For example, a DRAM can comprise 512 rows or pages, with each row storing 512 16-bit data words. When reading data from or writing data to the DRAM, unnecessary changes in row addresses should be avoided because they result in a time delay when accessing the first data of the new row.

Furthermore, a separate auxiliary DRAM is typically provided for processing circuitry in the decoder other than the VDP. These auxiliary processes can include a digital data processor, audio processor, microprocessor, packet data processor, and OSD and other graphics processors. Moreover, while OSD data can consume a large portion of the bandwidth of the auxiliary DRAM due to data transfer requirements, the other auxiliary processes also must be periodically granted access to the DRAM to perform their designated functions. The efficient utilization of such an auxiliary DRAM in the decoder thus requires a scheme that minimizes the amount of required memory while also maintaining the required data access rates (i.e., memory bandwidth). Requests for access to the DRAM made by the various processing circuitry must be prioritized and serviced efficiently. Although ideally, all processes would be given access instantly, in reality only one process can have access to the DRAM at a given time.

It would therefore be advantageous to provide a memory arbitration scheme in a digital video decoder which efficiently manages access to a DRAM among several client processes. Such a scheme should efficiently allocate the bandwidth of a DRAM bus, and be synchronized to arbitrate from one process to the next. The system should be compatible with an on-screen display data processor in the decoder, where such data typically consumes a large portion of the total DRAM bus bandwidth.

The present invention provides a memory arbitration scheme and apparatus having the aforementioned and other advantages.

SUMMARY OF THE INVENTION

In accordance with the present invention, a DRAM arbiter is disclosed which manages and controls access to a DRAM bus by a number of client processes in a video decoder.

The arbiter is tuned to efficiently time-multiplex access to a DRAM among a number of client processes which are required in an Motion Pictures Experts Group (MPEG) or similar digital television delivery system. These processes include, for example, an on-screen display (OSD) graphics processor, host microprocessor interface, graphics accelerator functions, a compressed digital audio processor, and a digital data processor. The arbiter also receives packetized data from an MPEG transport layer in the received signal for subsequent distribution to the DRAM.

When access to the DRAM bus is granted by the arbiter, the selected client process will be granted a predetermined amount of time to read data from or write data to the DRAM. Those processes which are bidirectional (i.e., can either read from or write to the DRAM) will only be able to read or write in a given access period or time slot. Furthermore, the selected client process will be able to access more data from the DRAM if it does not require a DRAM row change. Further efficiencies result since access can be terminated early when the selected client process does not require the full access time, when a process does not require access at all, or when the memory must be re-addressed and the re-addressing will consume the remainder of the allotted access time.

Arbitration is useful, for example, in time-division multiplex schemes, where a number of processes are given fixed time slots to access a memory. However, in accordance with the present invention, an arbiter optimizes the bandwidth allocation of a DRAM bus. Additionally, a timing scheme is disclosed that allows the arbiter to efficiently use each clock cycle to arbitrate from one process to the next. The arbiter thus allows servicing of a series of multiplexed data communications channels that are received at various data rates. The arbiter is particularly applicable to MPEG digital television delivery systems.

In accordance with the present invention, a DRAM controller associated with the arbiter sequentially provides access to the DRAM bus by a plurality of client processes for data transfer between the DRAM and the client process based on priority criteria. Access is terminated based on termination criteria. Furthermore, the controller addresses the memory according to the client process which is currently provided access. The priority criteria includes the required bandwidth of the client processes and whether the process has requested access. Termination criteria includes whether the client process has terminated its access request, and whether the end of the access period has been reached.

Moreover, the arbiter can be represented as a state machine that includes a number of taps which symbolize access paths between the various client process circuitry and the DRAM. Each client process is assigned to one or more of the taps according to its bandwidth requirements. As a result, the present invention provides an arbiter for optimizing the bandwidth of a DRAM bus among a number of competing client processes. The arbiter also receives packetized data for storage in the DRAM and subsequent retrieval by the client processes.

BRIEF DESCRIPTION OF THE DRAWINGS

FIG. 3b is a timing diagram of the arbitration service sequence in accordance with another embodiment of the present invention.

DESCRIPTION OF THE PREFERRED EMBODIMENTS

The present invention relates to an arbiter apparatus and arbitration method which manages and controls access to a dynamic random access memory (DRAM) by a number of client processes in a digital video decoder.

The arbiter efficiently multiplexes access to a DRAM among a number of processes which are required, e.g., in a MPEG or similar digital television delivery system. These processes include, for example, on-screen display (OSD) graphics, microprocessor interface, graphics accelerator functions, digital audio delivery, and digital data delivery. In particular, the arbiter is effective in optimizing bandwidth allocation of the DRAM bus when the OSD data comprises a large portion of the DRAM bus bandwidth.

The arbiter evaluates access request signals from each of the client processes. Based on priority and termination criteria, the arbiter decides the order and duration of access. When access to the DRAM is granted by the arbiter, the selected process will be allowed to read data from or write data to the DRAM for a predetermined time period. Furthermore, a client process will be denied access if it has not requested access, and access can be terminated early if access is no longer requested or under other circumstances discussed below. In this manner, the arbiter optimizes bandwidth allocation of the DRAM bus by the client processes.

Figure 1:
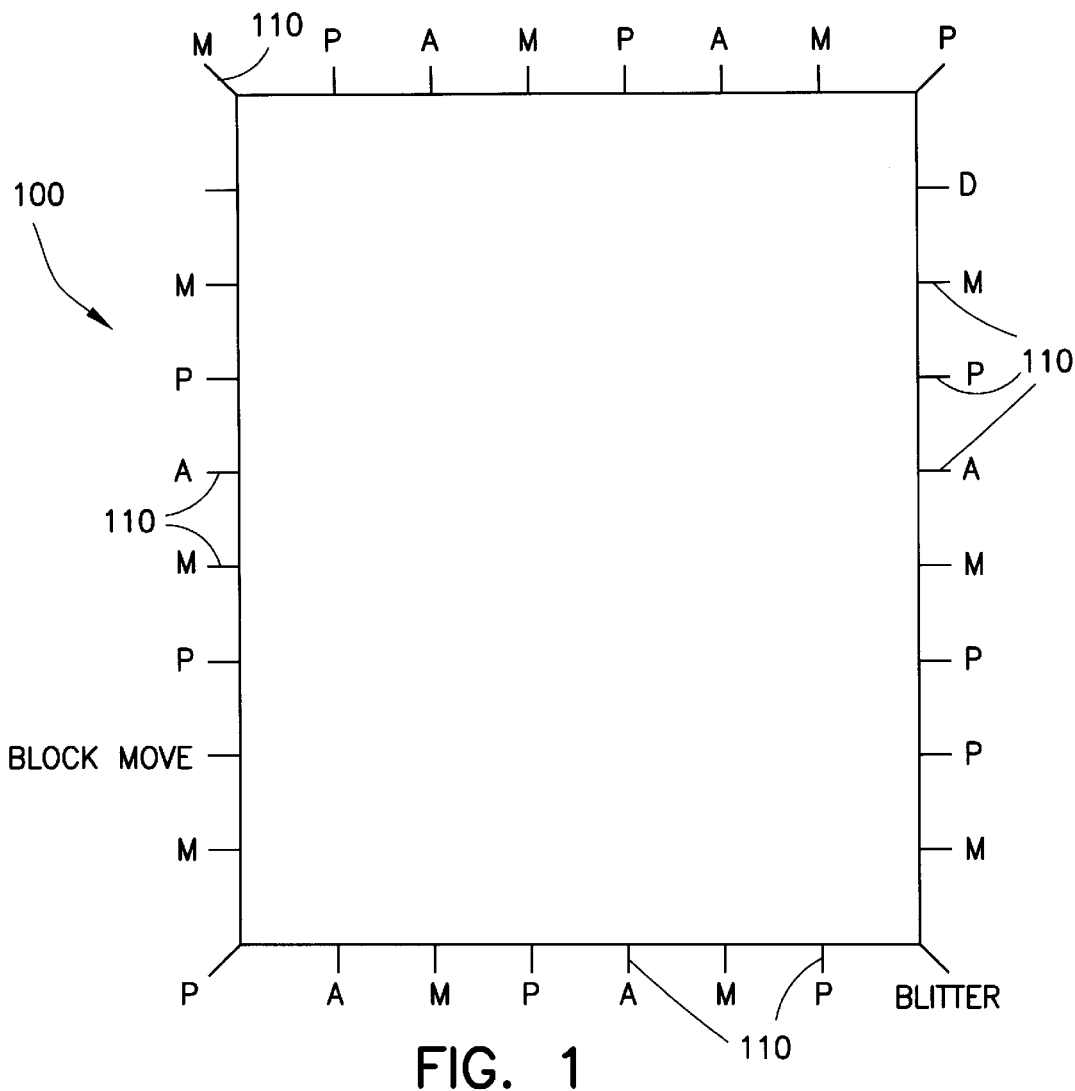
FIG. 1 is a diagrammatic illustration of the DRAM arbiter in accordance with the present invention.

FIG. 1 is a diagram of the DRAM arbiter in accordance with the present invention. The arbiter, shown generally at 100, is a state machine which includes a number of taps 110 which represent communication paths assigned to various client processes that must be "serviced". A client process is serviced when it is granted access to the DRAM bus to receive data from or write data to the DRAM. In a preferred embodiment of the present invention, those processes which are bidirectional (i.e., can either read from or write to the DRAM) will only be able to (i) read or (ii) write in a given access period. This constraint, although not mandatory, provides greater predictability in the bandwidth allocation among the various client processes. That is, the data transfer throughput for a given bidirectional client process can vary greatly if both read and write transfers can occur in a single time slot because of the "overhead" cost (i.e., time delay) in reconfiguring the DRAM bus.

In one embodiment, the client processes are sequentially serviced in an order determined by moving clockwise around the perimeter of the arbiter 100. Moreover, the number of taps 110 located at the perimeter of the arbiter can be determined according to the data transfer requirements of each client process. Client processes which require relatively less DRAM access time (i.e., bandwidth) are provided with fewer taps, while processes which require more DRAM access time are provided with more taps, as will be explained in greater detail below.

For example, in FIG. 1, "P" represents a packet processor tap, "D" represents a digital data tap, "M" represents a microprocessor interface tap, and "A" represents an audio data processor tap. "Blitter" represents a first graphics processing function used for font rendering in an OSD processor, and "Block Move" represents a second graphics processing function related to background text in the OSD processor. Both the Blitter and Block Move processes are known generally as graphics accelerator functions since they speed the production of graphics data for use in the OSD processor. In the embodiment shown, for each revolution around the perimeter of the arbiter, the "P" process will be granted access twelve times, the "M" process will be granted access eleven times, the "A" process will be granted access six times, and the "D", "Blitter" and "Block Move" processes will each be granted access once. Additionally, taps are provided but not shown in FIG. 1 for the OSD processor client. Since, as discussed below, the OSD processor can consume approximately two-thirds of the DRAM bandwidth, two OSD taps are provided between each of the other client process taps shown. In the embodiment of FIG. 1, the arbiter 100 includes ninety-six taps 110. Thus, a total of ninety-six access periods or time slots are scheduled in one revolution of the arbiter, with the OSD processor receiving sixty-four time slots, and the other client processes sharing the remaining thirty-two time slots.

Figure 2:
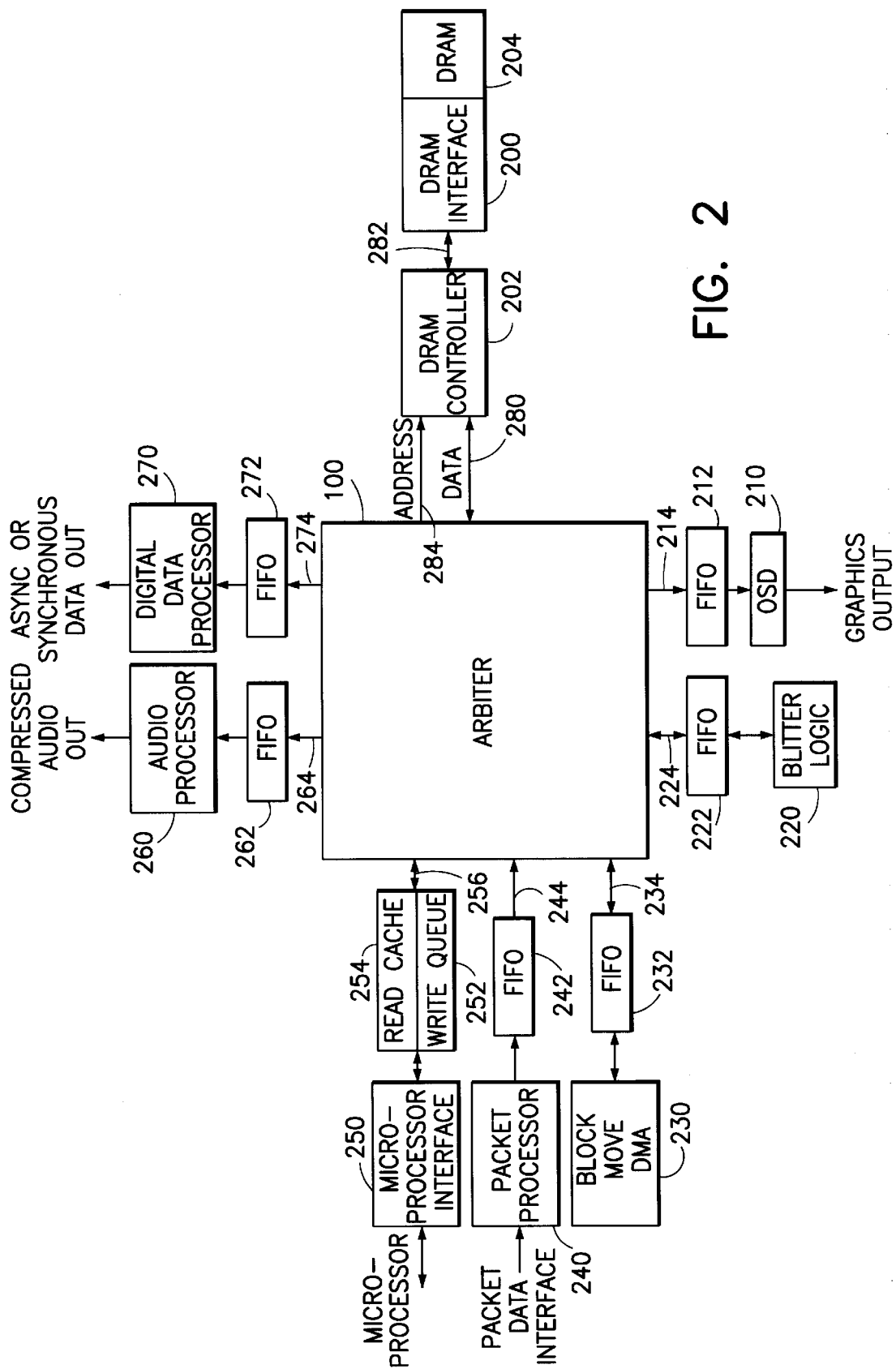
FIG. 2 is a block diagram of the arbiter in a digital television system application in accordance with the present invention.

FIG. 2 is a block diagram of the arbiter in a digital television system application in accordance with the present invention. The arbiter 100 time-multiplexes access by a plurality of client processes to a DRAM interface 200 (i.e., bus). Packetized data is received and demultiplexed at packet processor 240 and temporarily stored in an associated FIFO 242 (first in, first out) memory buffer. The priority criteria used by the arbiter in selecting a client process can include the degree to which the FIFO is full. That is, it may be desirable to service a client process with an associated FIFO only when the FIFO is storing a predetermined amount of data. Moreover, the FIFO must be sized to prevent underflow or overflow, but, in one embodiment, a FIFO size of sixteen words in depth has been found to be satisfactory. Further, the client processes include individual control and data transfer means for sending data to or retrieving data from their associated FIFO when the other client processes are being serviced by the arbiter 100.

The data received by the packet processor 240 can comprise, for example, time-multiplexed data segments from a received television signal. In particular, in a digital television application, packetized data from an MPEG transport layer of the received signal is demultiplexed by the packet processor 240 and distributed to the DRAM 204 via the DRAM interface 200. Other types of data received at the packet processor 240 are used by a microprocessor interface 250, graphics accelerator functions 220 and 230, a digital audio processor 260, and a digital data processor 270. Data stored in the packet processor FIFO 242 is written to the DRAM 204 when the packet processor 240 is serviced. The packet processor 240 is serviced relatively frequently since, in one embodiment, it has the second highest DRAM bus bandwidth requirement (after the OSD processor 210).

The microprocessor interface 250 uses the DRAM 204 as a temporary "scratch pad" memory and extracts control channel messages from the demultiplexed packet data. For example, the microprocessor interface 250 retrieves packet data from the DRAM 204 for use in building pixel character data. This packet data, which includes programming information and is received from the incoming signal via the packet processor 240, is subsequently used by the OSD processor 210. The microprocessor interface 250 includes an associated read cache 254 and write queue 252 for use in reading data from and writing data to the DRAM 204, respectively, in separate access periods.

The audio processor 260 receives compressed digital data demultiplexed by the packet processor 240 and stored in the DRAM 204, and formats the data for delivery to an audio decompression processor. The audio data can comprise, for example, the soundtrack that accompanies a television program, an alternate language accompaniment for foreign-language viewers, or an audio-only service. The audio processor 260 includes a FIFO 262 which receives data via a path 264.

Digital data processor 270 with FIFO 272 reads data from the DRAM via path 274. The digital data processor 270 extracts digital data demultiplexed by the packet processor 240 and formats the data for delivery to the user via an external data connector port (not shown). Both synchronous and asynchronous data are processed by the data processor 270. With asynchronous data, for example, an RS-232 type connector may be used to output the data from the decoder to an external device such as a personal computer (not shown). Data transmitted with the television signal can include, for instance, stock price data, weather data, or personal messages.

On-screen display (OSD) processor 210 with FIFO 212 receives data from the DRAM via path 214. The OSD processor 210 extracts pixel information from the DRAM 204 and generates graphics data for display on a television screen or similar output device.

Blitter processor 220 with FIFO 222 reads data from and writes data to the DRAM 204 via path 224. The Blitter circuit is a font rendering function used for graphics, and pixel expansion and manipulation. That is, the Blitter circuit determines the font size and shape to be used in the OSD graphics. Furthermore, the Blitter circuit 220 is known generally as a graphics accelerator circuit since it speeds the graphics capabilities of the decoder.

The Block Move processor 230 and FIFO 232 reads data to and writes data from the DRAM 204 via path 234. The Block Move processor 230 is used to efficiently copy or move large blocks of data from the DRAM 204 within the DRAM address space, and is essentially a direct memory access (DMA) controller. The Block Move circuitry 230 is used, for example, when it is necessary to repeat blocks of data with a vertical or horizontal shift, such as when a television viewer scrolls vertically or horizontally through OSD data on the television screen.

A DRAM controller 202 communicates with the arbiter 100 via paths 280 and 284, and with the DRAM interface 200 via path 282. The DRAM controller 202 addresses specific row and column locations in the DRAM 204 according to read and write addresses (e.g., 20-bit addresses) received via line 284 and provided over address lines (not shown) by the various client processes. The DRAM interface 200 comprises, for example, a conventional 16-bit data bus. Data is transferred between the DRAM controller 202 and the DRAM 204 via path 282, while data is transferred between the DRAM controller 202 and the arbiter 100 via data path 280.

The arbiter 100 can be represented as a state machine that time-multiplexes a plurality of client processes, and may be realized in hardware in a manner known to those skilled in the art. For example, a hardware description software such as "Verilog" may be employed by inputting the desired control logic of the arbiter 100. The software is then compiled to determine a configuration of transistors that provides the corresponding circuitry. Furthermore, the DRAM controller 202 associated with the arbiter 100 is responsive to timing means (not shown) for synchronizing access to the DRAM bus 200. Such timing means are known to those skilled in the art, and can include, for example, an oscillator operating at, e.g., 27 MHz. Note that while all client processes are synchronized to the arbiter, the client processes can include individual timing means independent of the arbiter clock for performing their individual functions such as outputting data. For example, the OSD 210 processor can output pixel data at 13.5 MHz.

In one embodiment, each access period or time slot provided by the arbiter 100 is equivalent to fourteen clock cycles of the arbiter clock. However, not all clock cycles are available for accessing the DRAM 204. A first and a second clock cycle are required for the arbiter 100 to arbitrate from one client process to the next, and to grant service to the selected client. In this step, the arbiter determines the next client process which will be granted access to the DRAM interface 200. Generally, access is granted in an order indicated by moving around the perimeter of the arbiter 100 of FIG. 1 in a clockwise direction. However, if the next scheduled client has not requested access, access to it will not be granted, and the next subsequent client process that has requested access will be selected instead. This avoids the inefficient "dead time" of conventional time multiplex schemes where no data transfer occurs. Next, service to the selected client process is initiated. A particular row and column of the DRAM 204 is addressed depending on the selected client process, and the DRAM interface 200 is made available to the selected client process so that data transfer can begin.

In the third through thirteenth clock cycles, data can be exchanged between the DRAM 204 and the client process. This exchange can include read or write operations, although both read and write actions should not occur in the same time slot in order to avoid unnecessary time delays. In one embodiment, the packet processor 240 only writes data to the DRAM, the audio data processor 260, digital data processor 270, and OSD processor 210 only read data from the DRAM, and the Block Move graphics processor 230, microprocessor interface 250 and Blitter graphics processor 220 have both read and write capabilities. When a 16-bit DRAM bus is used, a 16-bit data word can be transferred in one clock cycle.

Thus, up to eleven data words can be transferred during the third through thirteenth clock cycles. That is, if the read or write actions do not require a row change in the DRAM 204, then each of the eleven clock cycles is utilized for data transfer. However, if a DRAM row change is required in the third through thirteenth cycles, only eight of these cycles can be utilized for data transfer since the row change consumes three clock cycles. Generally, data is arranged in the DRAM such that no more than one row change is required in a given access cycle. In the fourteenth clock cycle, service to the selected client process is completed, and the above procedure is repeated at the first cycle for the next client.

Figure 3A:
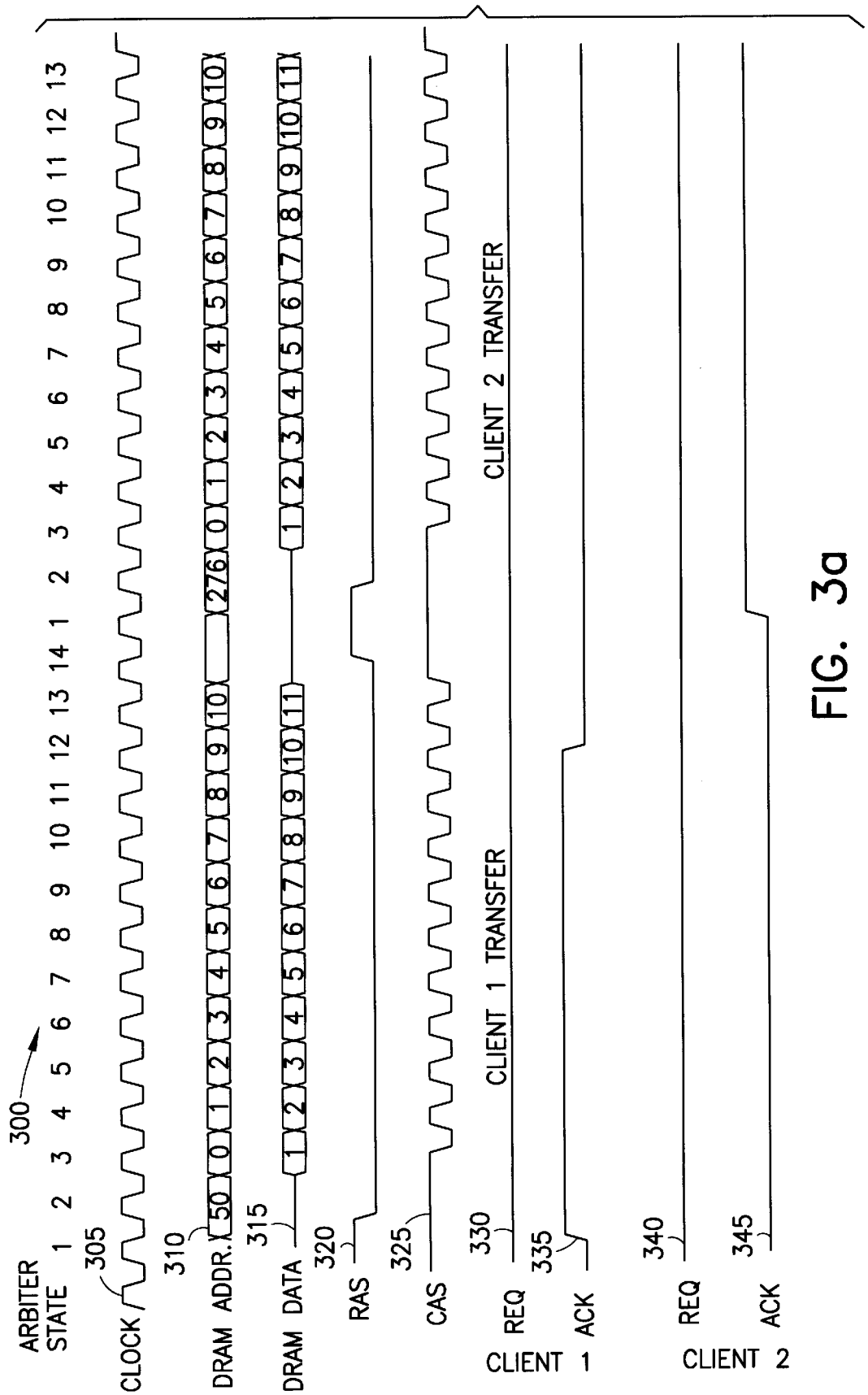
FIG. 3a is a timing diagram of the arbitration service sequence in accordance with the present invention.

FIG. 3a is a timing diagram of the arbitration service sequence in accordance with the present invention. In the example shown, there are no DRAM row changes (breaks) required, and each client process transfers eleven data words to or from the DRAM in a fourteen clock cycle time slot. Time lines 300, 305, 310, 315, 320 and 325 designate interface signals between the arbiter and the DRAM. Line 300 represents the arbiter state, which runs from one through fourteen. In the first and second arbiter states, a client process is selected and a corresponding DRAM row on the DRAM bus is determined. In the third through thirteenth arbiter states, data transfer occurs. The fourteenth arbiter state is an exit cycle, where service to the client process is terminated.

Time line 305 shows timing pulses (e.g., from a 27 MHz clock oscillator), time line 310 shows the DRAM address, including the row number followed by the column number, and time line 315 indicates the data word that is being transferred (e.g., words one through eleven). Time line 320 shows a row address strobe (RAS) signal, while time line 325 shows a column address strobe (CAS) signal. Time lines 330, 335, 340 and 345 indicate interface signals between the arbiter and the client processes. Line 330 is an access request signal from a first client process, while line 335 indicates when the request is acknowledged and granted by the arbiter. Line 340 is an access request signal from a second client, while line 345 indicates when the request is acknowledged and granted.

At the first arbiter state at the left-hand portion of FIG. 3a, both the first and second client processes have requested access to the DRAM (see lines 330 and 340). A number of other client processes (not shown) may also be requesting access at any given time. The arbiter determines which of the client processes will be given access based on priority criteria. This decision will usually take less than one full clock cycle. Access is granted to the first client during the first clock cycle as shown in time line 335. The remainder of the first arbiter state is used, along with the second arbiter state, by the arbiter controller to select the DRAM address requested by the selected client process. For example, pre-assigned regions of the DRAM can be used to store data of particular client processes. The row of the DRAM is first accessed by the RAS (lines 310 and 320), then the column is accessed (lines 310 and 325). DRAM row fifty, column zero in this example corresponds to the desired DRAM address for the first client. Thus, beginning at the third arbiter state, data transfer between the client process and the DRAM commences. A first data word (line 315) is transferred between the first client process and row fifty, column zero of the DRAM. At the fourth cycle, the row address remains at row fifty, and the CAS has activated to address column one of the DRAM (lines 310 and 325). A second data word is thus transferred, and so on. The process continues through the thirteenth arbiter state, where an eleventh data word is transferred. At the fourteenth arbiter state, no data transfer occurs, and the CAS, RAS, and arbiter state are reset. Access to the DRAM by the first client process is thus terminated despite the fact that the first client process continues to request service (line 330).

The process is repeated in a similar manner for the second client. Referring to the right-hand portion of FIG. 3a, during the first two arbiter states, the second client is acknowledged and granted access as shown in time line 345. In this example, row 276 of the DRAM is used for data transfer with the second client. DRAM row 276, column zero is accessed during the third arbiter state, and the second client proceeds to transfer data during the third through thirteenth arbiter states. Service to the second client is terminated during the fourteenth arbiter state, and the process is repeated for a subsequent client process (not shown).

Note that various modifications of the timing scheme are possible. For example, when the same client is granted access for adjacent fourteen-clock cycle time slots, it is possible to design the arbiter to continue transferring data during the fourteenth clock cycle of the first time slot and the first and second clock cycles of the subsequent time slot. Alternatively, the time slot duration may be adjusted according to the selected client process. Such variations may, however, result in additional complexity and expense in implementing the arbiter. For example, if one client process is serviced for an inordinately long duration, the size of FIFOs of the other client processes may have to be increased to prevent overflow. Additionally, processing delays in the video decoder may occur.

FIG. 3b is a timing diagram of the arbitration service sequence in accordance with another embodiment of the present invention. In the embodiment shown, there is one DRAM row break required during the access period, and each client process consequently transfers only eight data words in a fourteen clock cycle period. Time lines 300 through 345 correspond to the like-numbered time lines in FIG. 3a. As shown at the left hand portion of FIG. 3b, at the first and second arbiter states, access is granted to the first client and row 50 of the DRAM is addressed. During the third arbiter state, data is transferred between row 50, column 509 of the DRAM and the client process. Data is similarly transferred from row 50, column 510 during the fourth arbiter state, and from row 50, column 511 during the fifth arbiter state. However, the next data transfer is from a different row in the DRAM (i.e., row 51). Thus, data transfer is temporarily halted for three clock cycles while the new DRAM address is accessed (see RAS, line 320, and CAS, line 325). Data transfer resumes at the eighth arbiter state at row 51, column zero of the DRAM, and continues through the thirteenth arbiter state at row 51, column 4. Service to the first client is terminated during the fourteenth arbiter state, when the arbiter state, RAS and CAS are reset.

Furthermore, if the next data transfer requires a DRAM row change, and the three-clock cycle waiting period for re-addressing the DRAM will consume the remainder of the possible data transfer periods, the arbiter will immediately terminate access to the current client process and begin arbitrating access for the next client process. This saves time by avoiding unproductive waiting periods. In the example shown in FIG. 3b, if a row change were required in the ninth through eleventh DRAM access cycles (i.e., in the eleventh through thirteenth arbiter states designated in line 300), immediate termination of access to the current client would result in the next clock cycle.

Figure 3C:
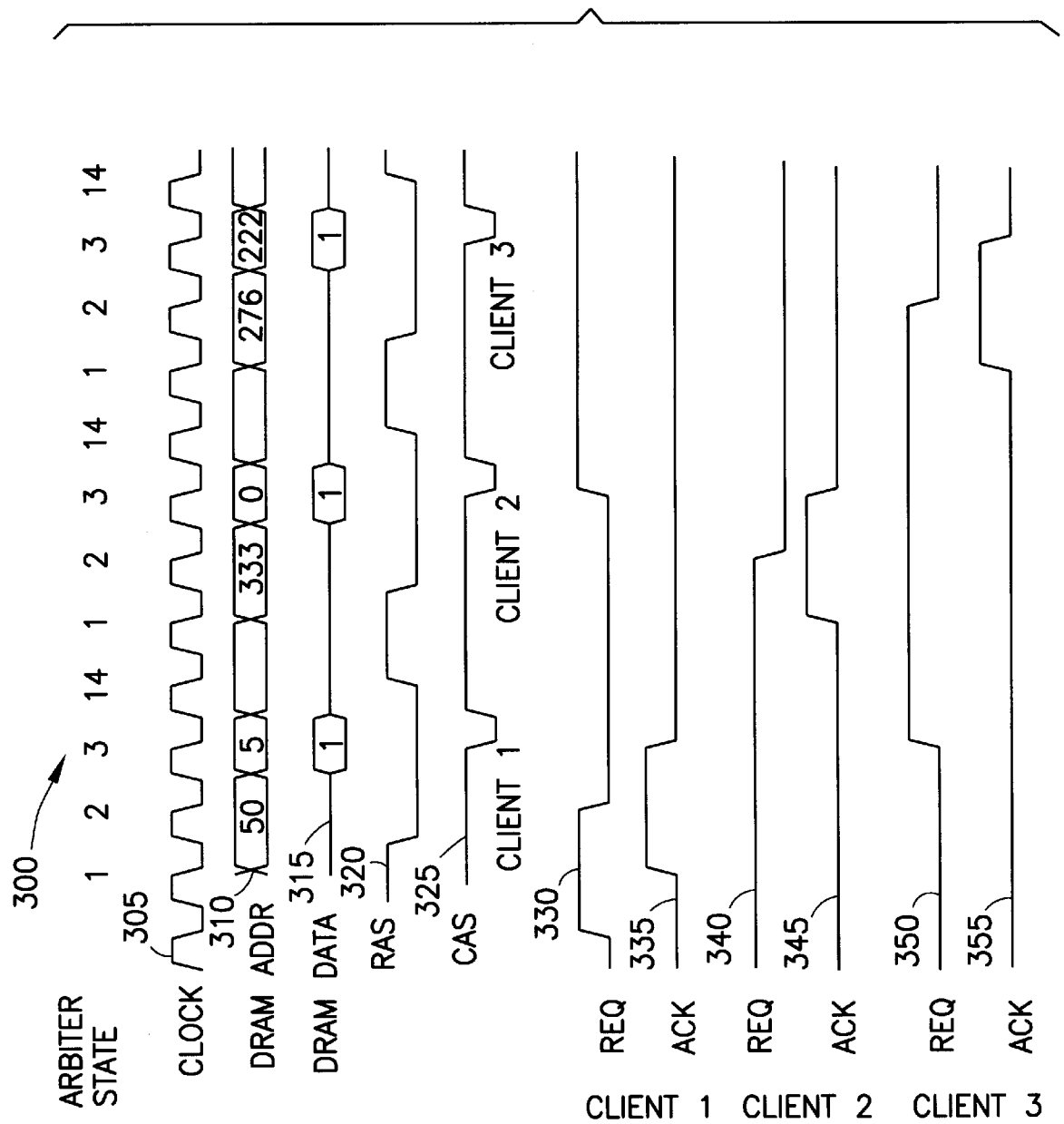
FIG. 3c is a timing diagram of the arbitration service sequence in accordance with yet another embodiment the present invention.

FIG. 3c is a timing diagram of the arbitration service sequence in accordance with yet another embodiment the present invention. In the embodiment shown, each client process requests only a single data word transfer to or from the DRAM. This embodiment may occur, for example, when the microprocessor interface client performs a read, modify, and write sequence and therefore needs to transfer only one word at a time. Time lines 300 through 345 correspond to the like-numbered time lines in FIG. 3a. Time lines 350 and 355 indicate the request and acknowledgement signals, respectively, for a third client process. During the first and second arbiter states, access is granted to the first client, and row 50 of the DRAM is addressed. During the third arbiter state, one data word is transferred between row 50, column 5 of the DRAM and the first client process. At the next cycle (arbiter state=14 at line 300), the first client no longer is requesting access, so the arbiter terminates access, and the arbiter state, RAS, and CAS are reset (lines 300, 320 and 325). This cycle is the fourth sequentially, but the same functions are performed as in the fourteenth arbiter state as shown previously in FIGS. 3a and 3b, when the full access period is used.

The next two clock cycles (arbiter state=1 and 2 at line 300) are equivalent to the first and second clock cycles of a regular 14 cycle access period. During these cycles, the arbiter grants access to the second client, and row 333 of the DRAM is addressed. At the next cycle (arbiter state=3 at line 300), equivalent to a third cycle, column zero of row 333 is addressed and one word is transferred between the DRAM and the second client. The process continues such that third client is sequentially granted access for one data word read or write cycle.

Figure 4:
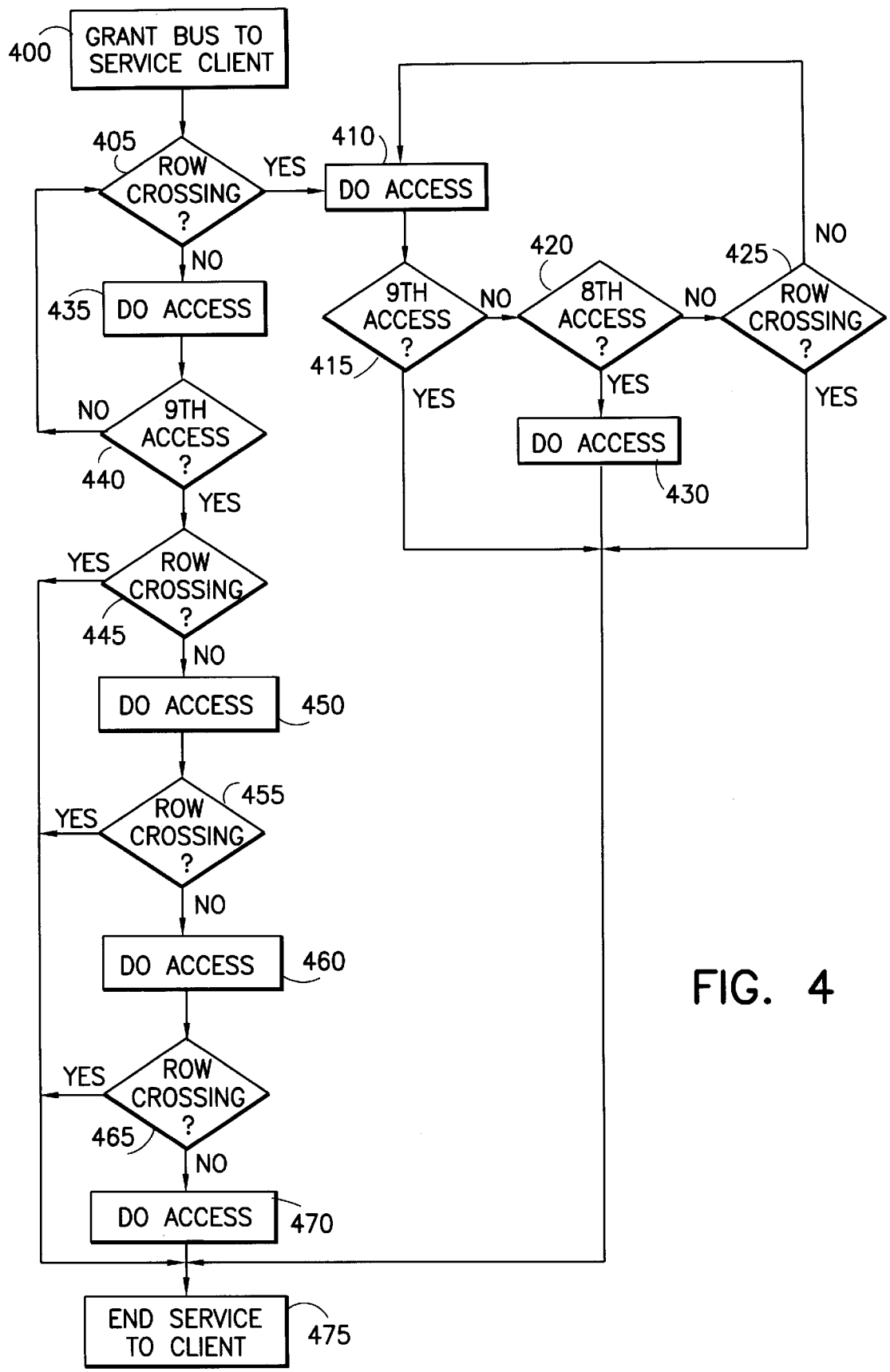
FIG. 4 is a flow diagram of the arbitration service sequence in accordance with the present invention.

FIG. 4 is a flow diagram of the arbitration service sequence in accordance with the present invention. At block 400, the arbiter grants access to the DRAM interface for a selected client process for up to fourteen clock cycles. At block 405, the arbiter determines whether a row change is required during the current clock cycle. If so, the access period continues at block 410. That is, the next three clock cycles (starting with the current cycle) are used to address the new DRAM row. If the current arbiter state access period is the ninth DRAM access at block 415, service to the current client is terminated at block 475 since no additional data can be transferred by the time the eleventh access period (thirteenth arbiter state) is reached.

If the eighth arbiter state access period is reached at block 420, another access period will be granted at block 430. If the current access period is the first through seventh at block 425, another access period is granted at block 410. Returning to block 405, if a row change is not requested, access is granted to the selected client process at block 435. Additional access periods are granted until a row change is required or the ninth access period is reached. If the start of the ninth access period is reached at block 440, and there is no row change required at block 445, then the ninth access period is granted at block 450. The tenth and eleventh access periods are similarly granted at blocks 460 and 470, respectively, unless there is a row change required at blocks 455 or 465. If a row change is required, service to the client process is terminated immediately at block 475. After service has been terminated at the end of the fourteen clock cycles or at an earlier time, the arbiter selects another client and repeats the above process, granting service to the next client process at block 400.

In the embodiment shown, access time slots of up to 14 clock cycles are sequentially allocated to the client processes by the arbiter based on priority criteria. Various criteria can be used. For example, in a video decoder with OSD capability, it has been observed that data used by the OSD processor can comprise a large portion of the data which must pass through the DRAM interface. Furthermore, the OSD data must be transferred at a sufficiently high rate to provide the television viewer with a rapid response when using the OSD functions. Accordingly, the OSD processor consumes a large portion of the overall available DRAM bandwidth, and must be given a high priority. The priority criteria also includes which client process was last serviced, for example, when access is granted based on a sequence determined by circumnavigating the perimeter of the arbiter of FIG. 1.

When the arbiter allocates access periods in time slots of up to fourteen clock cycles and a clock running at 27 MHz is used, the corresponding time to service one client process in one time slot is 14 cycles×27 MHz=0.5 microseconds. Furthermore, as discussed, each time slot is allocated to a state in the arbiter state machine which corresponds to the selected client process. For example, if the current arbiter state is "M", the microprocessor interface is being serviced. At the beginning of the next time slot, the arbiter uses priority criteria to evaluate the other client processes which have requested access. In one embodiment, if the OSD client is requesting access, it will be granted access in the next time slot. If the OSD client is not requesting access, the packet processor is given the next highest priority, with the other processes following thereafter. For example, the OSD processor typically does not request access during the horizontal blanking interval of the video signal.

The priority criteria for the arbiter includes the bandwidth requirement of each of the client processes. The required bandwidth can be found by assuming that each client process transfers eight sixteen-bit data words in one fourteen clock cycle time slot (e.g., there is one DRAM row change during the time slot, and the memory interface is a 16-bit bus). At this rate, the maximum number of bits that can be transferred in one time slot is N=8 words/14 cycles×16 bits/word×27 MHz=246.8 Megabits per second (Mbps). This is the maximum available DRAM bandwidth.

The required bandwidth of the OSD client process 210 can be found as follows when the process is based on bit-mapped graphics. This means that each pixel used in the OSD processor is represented by a fixed number of bits stored in the DRAM. For example, in one embodiment, four bits per pixel are used. Moreover, a hardware vertical filter can be used as part of the OSD graphics processing. In this case, the graphics pixel is filtered with the pixels above and below it. Thus, data from three pixels is required for each output pixel. The OSD circuitry outputting data at a clock speed of 13.5 MHz, for instance, thus reads three four-bit vertical pixels from the DRAM at each pixel clock cycle (one pixel clock cycle is equivalent to two arbiter clock cycles). The corresponding OSD bandwidth requirement is 4 bits/pixel×3 pixels/OSD clock cycle×13.5 MHz=162 Mbps, which is 162/246.8=67% of the available DRAM bandwidth.

Other client processes are allocated bandwidth based on a specified requirement. The digital data processor client 270 is allocated a predetermined bandwidth according to an assumed data transfer rate. For example, 2 Mbps can be allocated, which corresponds to an average data transfer rate of approximately one bit per 14-cycle time slot. The digital audio processor client, operating at a clock rate of 13.5 MHz, can be allocated 13.5 Mbps of bandwidth. The packet processor client bandwidth is specified at 29.26 Mbps. The remainder of the bandwidth (approximately 41 Mbps) is allocated to the Block Copy processor 230, microprocessor interface 250, and Blitter (font render) 220 processor, where each of these processes requires a minimum bandwidth of at least 2.57 Mbps. Thus, additional bandwidth can be allocated by the arbiter when available. Moreover, the microprocessor interface is given priority over the Blitter and Block Copy client processes.

Referring again to the arbiter 100 of FIG. 1, the number and assignment of taps 110 in the arbiter is determined according to the bandwidth requirements calculated above. For example, the packet processor client requires 29.26 Mbps/246.8 Mbps=11.8% of the available taps, or 11.8%× 96 taps=12 taps. In the embodiment of FIG. 1, recall that the taps are not physical connections but are a graphical depiction of the arbiter as a state machine. To minimize the complexity of the state machine and the size of memory buffers associated with the client processes, the number of taps should be limited. Here, ninety-six taps are used, but only 32 are shown for clarity. Between each of the 32 taps shown, two OSD taps are present but not shown.

Figure 5:
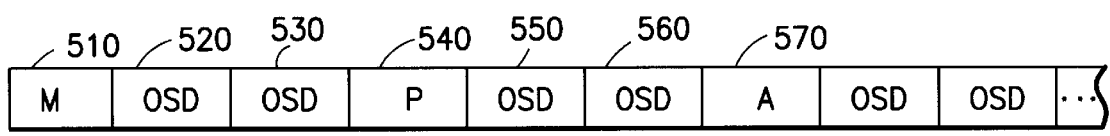
FIG. 5 is a high level timing diagram of the arbitration service sequence in accordance with the embodiment of FIG. 1.

FIG. 5 is a high level timing diagram of the arbitration service sequence in accordance with the embodiment of FIG. 1. As discussed, the arbiter grants access to the various client processes using priority criteria including whether the process is requesting access, and the bandwidth requirement of the process. A typical service sequence is determined by sequentially servicing the taps 110 at the perimeter of the arbiter 100 of FIG. 1, bearing in mind that two OSD taps are located between each tap shown. Beginning in the upper left hand corner of the arbiter, client "M" (microprocessor interface) is serviced in a first time slot 510. The time slot allocated is up to fourteen clock cycles, wherein up to eleven data words can be transferred to or from the DRAM with no row breaks, or up to eight data words with one row break. In the second time slot 520, the OSD client is serviced for fourteen clock cycles. The OSD client is serviced again in the third time slot 530, for an additional fourteen clock cycles. In the fourth time slot 540, client "P" (packet processor) is serviced. The OSD client is serviced again in the fifth time slot 550 and sixth time slots 560, and client "A" (audio processor) is serviced in the seventh time slot 570. The process continues as the perimeter of the arbiter 110 is circumnavigated. The arbiter need not service each client process sequentially, however, and may skip over one or more clients based on the priority criteria.

Figure 6:
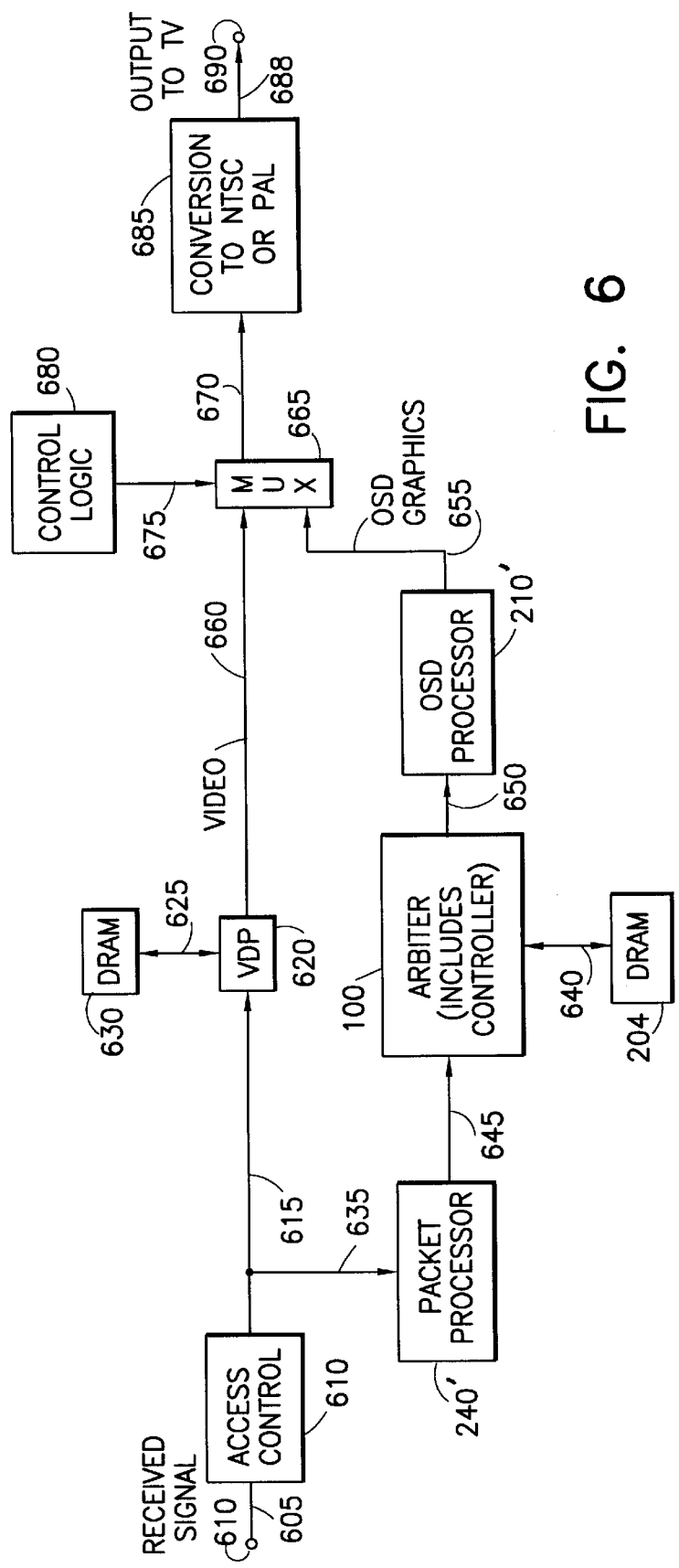
FIG. 6 is a block diagram of the arbiter of the present invention used in connection with a video decoder.

FIG. 6 is a block diagram of the arbiter of the present invention in a video decoder. The transmitted digital television signal is received at terminal 610 and communicated to an access control function via line 605. The access control function determines whether the video decoder is authorized to receive the signal. If so, the signal is coupled via line 615 to the video decompression processor (VDP) 620, and to the packet processor (including FIFO) 240' via line 635 and the arbiter 100 via line 645. The packet processor 240' demultiplexes packetized data received via line 635 for storage in the DRAM 204 via line 640 and, subsequently, retrieval by the other client processes (not shown). The VDP 620 performs various decoding steps which correspond to the inverse of the encoding steps at the transmitter. For example, the VDP 620 may use an inverse discrete cosine transformation, Huffman decoding, inverse normalization, and other known decompression techniques to restore the pixel data corresponding to a current video frame. Motion vector data in the received signal is used to motion-compensate the current frame data. The VDP 620 communicates with a DRAM 630 which is separate from the arbiter DRAM 110. A decoded video signal is output from the VDP 620 via line 660 to a multiplexer 665. The VDP communicates with the arbiter 100 only under limited circumstances, for example, when the VDP 620 video output is filtered with the OSD processor (including FIFO) 210' graphics output to produce a blended image.

The arbiter 100 multiplexes access to the DRAM 204 by the client processes as discussed above. In particular, in the embodiment shown, OSD graphics capability is provided in the video decoder by the OSD processor 210'. The OSD processor 210' communicates with the arbiter 100 via line 650. Other graphics functions which produce data used by the OSD processor 210' include the Blitter (font render) processor and the Block Move processor (not shown). OSD graphics data is output from the OSD processor 210' via line 655 and coupled to a multiplexer 665. Control logic at block 680 controls the multiplexer 665 such that video data from line 660 and/or OSD graphics data from line 655 is output on line 670. The data on line 670, which can be in an International Radio Consultive Committee (CCIR) 656 format, is typically converted to NTSC or PAL format at converter block 685 as required by the specific application. The converted data at line 688 is then ready for output to a display device via terminal 690.

As can be seen, the present invention provides a memory arbiter which manages and controls access to a DRAM bus by a number of client processes in a video decoder using priority criteria which optimizes the bandwidth allocation of the DRAM bus. The arbiter can be represented as a state machine that efficiently time-multiplexes access to the DRAM among a number of client processes including an on-screen display (OSD) graphics processor, a microprocessor interface, graphics accelerator functions, a compressed digital audio processor, and a digital data processor.

Although the invention has been described in connection with various specific embodiments, those skilled in the art will appreciate that numerous adaptations and modifications may be made thereto without departing from the spirit and scope of the invention as set forth in the claims.

We claim:

1. Apparatus for controlling access to a memory via a memory interface by a plurality of client processes, comprising:

an arbiter for providing access opportunities to said memory by said client processes in a predetermined client process sequence for data transfer between the memory and the client processes; and a controller for addressing said memory according to the client process which is currently provided access; wherein:

the client processes are granted access opportunities to said memory for a predetermined number of access periods; and access to the memory is granted to a current client process that requests access for up to the predetermined number of access periods, but access to the memory is terminated before the predetermined number of access periods have elapsed if the current client process no longer requires access to said memory, and is granted instead to the client process requesting access which follows the current client process in the client process sequence for at least a portion of a remainder of the predetermined number of access periods.

2. The apparatus of claim 1, wherein:

said memory is a DRAM with addresses comprising rows and columns, and the provision of access to a selected client process is terminated before said predetermined number of access periods have elapsed when said selected client process requires addressing a different row of said memory.

3. The apparatus of claim 2, wherein:

said access is terminated before the predetermined number of access periods have elapsed only when said addressing of a different row would consume a remainder of access periods allocated to the selected client process.

4. The apparatus of claim 1 wherein said client processes include on-screen display graphics for output to a display device.

5. The apparatus of claim 4 wherein said arbiter allocates a majority of its bandwidth to said on-screen display graphics client process.

6. The apparatus of claim 1 wherein said arbiter includes a packet processor for receiving and demultiplexing packet data and storing said demultiplexed data in said DRAM for use by other ones of said client processes.

7. The apparatus of claim 1, wherein:

the client processes are granted access opportunities to said memory for a predetermined number of access periods according to a predetermined bandwidth which is assigned to each of said client processes.

8. The apparatus of claim 1, wherein:

access to the memory is not granted to the client processes that are not requesting access.

9. A memory arbiter for selectively providing access to a memory by a plurality of client processors in a digital television system, wherein:

said client processors include a packet processor, microprocessor interface, and an on-screen display (OSD) graphics processor;

said arbiter provides said access in accordance with predetermined bandwidths which are assigned to each of said client processors by servicing said client processors in a client processor sequence and at a relative frequency determined by said predetermined bandwidths;

the client processors are granted access opportunities to said memory for a predetermined number of access periods according to the assigned predetermined bandwidths; and access to the memory is granted to a current client processor that requests access for up to the predetermined number of access periods, but access to the memory is terminated before the predetermined number of access periods have elapsed if the current client processor no longer requires access to said memory, and is granted instead to the client processor requesting access which follows the current client process in the client process sequence for at least a portion of a remainder of the predetermined number of access periods.

10. The memory arbiter of claim 9 wherein said memory is a dynamic random access memory (DRAM) with addresses comprising rows and columns, further comprising:

means for terminating access by a selected one of said client processors before the predetermined number of access periods have elapsed when said selected client processor requires addressing of a different row in said memory.

11. The memory arbiter of claim 10, wherein:

access to the memory is terminated before the predetermined number of access periods have elapsed only when said addressing of a different row would consume a remainder of access periods allocated to the current client processor.

12. The memory arbiter of claim 9, wherein:

the client processes are granted access opportunities to said memory for a predetermined number of access periods according to a predetermined bandwidth which is assigned to each of said client processes.

13. The memory arbiter of claim 9, wherein:

access to the memory is not granted to the client processes that are not requesting access.

14. A method for controlling access to a memory via a memory interface by a plurality of client processes, comprising the steps of:

defining access opportunities for each of said client processes to access said memory over a predetermined number of access periods; and granting access to the memory to a current client process that requests access for up to the predetermined number of access periods, but terminating access to the memory before the predetermined number of access periods have elapsed if the current client process no longer requires access to said memory, and instead granting access to the client process requesting access which follows the current client process in the client process sequence for at least a portion of a remainder of the predetermined number of access periods.

15. The method of claim 14 wherein said memory is a DRAM with addresses comprising rows and columns, comprising the further step of:

terminating access by a selected client process before said predetermined number of access periods have elapsed when said selected client process requires addressing of a different row in said memory.

16. The method of claim 15 wherein said access is terminated early only when said addressing of a different row would consume the remainder of access periods allocated to the selected client process.

17. The method of claim 14 comprising the further steps of:

providing packet data to a packet processor associated with said arbiter;

demultiplexing said packet data; and storing said demultiplexed packet data in said memory for subsequent transfer to said client processes.

18. The method of claim 14, wherein:

access opportunities to said memory are defined for a predetermined number of access periods according to a predetermined bandwidth which is assigned to each of said client processes.

19. The method of claim 14, wherein:

access to the memory is not granted to the client processes that are not requesting access.

* * * * *